(12) United States Patent
Dashevskiy et al.

(10) Patent No.: US 8,902,695 B2
(45) Date of Patent: Dec. 2, 2014

(54) APPARATUS AND METHOD FOR CLOCK SHIFT CORRECTION FOR MEASUREMENT-WHILE-DRILLING MEASUREMENTS

(75) Inventors: Dmitriy Dashevskiy, Nienhagen (DE); Patrick J. McGinley, Sugar Land, TX (US); John D. Macpherson, Sugar Land, TX (US); Andrew G. Brooks, Tomball, TX (US); Thomas G. Dahl, Schwuelper (DE); Mitchell G. Pinnell, Montgomery, TX (US); Paul Gerard Cairns, Houston, TX (US); Robin F. Randall, Spring, TX (US); Mark Andrew Hill, Houston, TX (US); Edward W. Robnett, Kingwood, TX (US)

(73) Assignee: Baker Hughes Incorporated, Houston, TX (US)

( * ) Notice: Subject to any disclaimer, the term of this patent is extended or adjusted under 35 U.S.C. 154(b) by 1142 days.

(21) Appl. No.: 11/949,444

(22) Filed: Dec. 3, 2007

(65) Prior Publication Data

US 2008/0137474 A1  Jun. 12, 2008

Related U.S. Application Data

(60) Provisional application No. 60/868,854, filed on Dec. 6, 2006.

(51) Int. Cl.
*G01V 1/40* (2006.01)
*G01V 11/00* (2006.01)
*E21B 47/00* (2012.01)

(52) U.S. Cl.
CPC .............. *E21B 47/00* (2013.01); *G01V 11/002* (2013.01); *G01V 2200/12* (2013.01)
USPC ............................... 367/13; 702/6; 73/152.45

(58) Field of Classification Search
CPC .............................. E21B 47/00; G01V 11/002
USPC .......... 73/152.45; 175/40, 48; 367/13, 79, 82, 367/83, 40; 368/46; 702/6, 11, 16, 18
See application file for complete search history.

(56) References Cited

U.S. PATENT DOCUMENTS

| | | | |
|---|---|---|---|
| 4,715,451 A | 12/1987 | Bseisu et al. | |
| 5,083,124 A | 1/1992 | Nordstrom | |
| 5,126,564 A | 6/1992 | Perry et al. | |
| 5,144,126 A | 9/1992 | Perry et al. | |
| 5,581,024 A | 12/1996 | Meyer, Jr. et al. | |
| 6,023,444 A * | 2/2000 | Naville et al. | 367/82 |
| 6,079,505 A | 6/2000 | Pignard et al. | |
| 6,088,294 A | 7/2000 | Leggett, III et al. | |
| 6,131,694 A | 10/2000 | Robbins et al. | |

(Continued)

FOREIGN PATENT DOCUMENTS

GB  2290869 A  10/1996
WO  WO0142614 A2  6/2001

*Primary Examiner* — Daniel L Murphy
(74) *Attorney, Agent, or Firm* — Cantor Colburn LLP

(57) ABSTRACT

The disclosure provides a method which includes transmitting signals over a time period between a downhole location and a surface location during drilling of a wellbore; recording the time of each signal at the surface using a surface clock and the time of each signal downhole using a downhole clock; and correcting the downhole measurements using the recorded times.

20 Claims, 3 Drawing Sheets

(56) References Cited

U.S. PATENT DOCUMENTS

| | | |
|---|---|---|
| 6,308,137 B1 | 10/2001 | Underhill et al. |
| 6,344,746 B1 | 2/2002 | Chunduru et al. |
| 6,400,646 B1 * | 6/2002 | Shah et al. ............ 367/82 |
| 6,424,595 B1 * | 7/2002 | Chenin ............... 367/82 |
| 6,618,674 B2 * | 9/2003 | Ireland et al. ........ 702/6 |
| 6,760,665 B1 * | 7/2004 | Francis .............. 702/6 |
| 6,769,407 B2 | 8/2004 | Cotton, III |
| 6,782,322 B2 | 8/2004 | Ireland |
| 6,837,105 B1 | 1/2005 | DiFoggio et al. |
| 6,871,410 B1 | 3/2005 | Le Jeune |
| 6,912,465 B2 * | 6/2005 | Collins et al. ......... 702/6 |
| 2002/0062992 A1 | 5/2002 | Fredericks et al. |
| 2003/0024305 A1 | 2/2003 | Ireland et al. |
| 2004/0117118 A1 | 6/2004 | Collins et al. |
| 2004/0138818 A1 | 7/2004 | Shray et al. |
| 2005/0007259 A1 | 1/2005 | Minto et al. |
| 2005/0035875 A1 | 2/2005 | Hall et al. |
| 2005/0279532 A1 | 12/2005 | Ballantyne et al. |
| 2006/0180349 A1 | 8/2006 | Dashevskiy |

* cited by examiner

APPARATUS AND METHOD FOR CLOCK SHIFT CORRECTION FOR MEASUREMENT-WHILE-DRILLING MEASUREMENTS

CROSS REFERENCE TO RELATED APPLICATIONS

The present application claims priority from U.S. Provisional Application 60/868,854, filed on Dec. 6, 2006.

BACKGROUND OF THE DISCLOSURE

1. Field of the Disclosure

The disclosure herein relates generally to correcting downhole measurements for clock drifts.

2. Description of the Related Art

To drill wells, such as hydrocarbon wells, a drill bit located at the end of a drillstring is rotated to drill into the formation. The rate of penetration (ROP) depends upon the weight on bit (WOB), the rotary speed of the drill bit, the type of the formation and the condition of the drill bit. The drill bit is attached to the bottom end of bottomhole assembly (BHA) that includes several formation evaluation (FE) tools or sensors that make measurements of formation properties. These tools include, for example, tools for determining density, porosity, resistivity, acoustic, nuclear and other properties of the formation surrounding the borehole during drilling of the wellbore. Similar measurements may also be made after the well has been drilled by conveying logging instruments on a wireline or coiled tubing. The BHA also includes other sensors for taking measurements relating to certain drilling and drillstring parameters, such as pressure, temperature, vibration, whirl, BHA inclination, weight-on-bit, rotational speed of the drill bit (RPM), etc.

These tools and sensors are longitudinally spaced (uphole of the drill bit). The distance of a tool or sensor from the drill bit is referred to herein as "offset" or "distance offset." The offset for certain of these tools and sensors can be from several feet up to over one hundred feet. The determination of the properties of the formation and the drilling environment is based upon the evaluation of a suite of measurements taken along the borehole (logs) that are properly aligned in depth.

For proper depth alignment of logs, typically, all measurement data from MWD tools are referenced to the time at which such measurements are made. For MWD measurements, the time when each measurement is made or taken is presumed to be known. For applications involving correlation of a log or different logs, it is useful to determine where the measurement is taken, i.e. the wellbore depth at which each measurement is taken. To determine the depth at which each measurement is taken, it is necessary to know the time-depth profile, i.e. where (with respect to the wellbore) the drill bit is located at the time of taking each measurement. It is also useful to know the wellbore profile, i.e. the wellbore location in space. The wellbore profile often is determined using suitable survey instruments such as accelerometers and/or gyroscopes. Using the time-depth profile and the wellbore profile, estimates may be made to place the MWD measurement along the wellbore and hence in space.

The wellbore profile and time-depth profile are generally known only with some finite accuracy. This affects the accuracy of the final logs. The downhole measurements are time-stamped using a downhole clock associated with a downhole tool. Often, different tools include their own time clocks, while the surface measurements are time-stamped using a surface clock, often a computer clock. Downhole clocks are used in relatively harsh environments (high temperature, pressure and vibration) and often drift over time.

When the tool or downhole clock does not produce the same time as the surface clock during the entire drilling run, any attempt to use time-depth profiles (which are based on the surface clock time) to convert from when to where can result in erroneous depth placement of the measurement. The error depends on, among other things, the amount of the drift (mismatch) of the downhole clock from the surface clock. Due to the non-linearity of the time-depth transformation, even a relatively small time drift can result in noticeable errors or in unacceptable logs.

In a drilling environment, typically surface and downhole clocks are synchronized before the drilling run. The clock drift is often determined after the run from the difference in time between surface and downhole clock after retrieving the BHA. Such methods may produce less than acceptable correction results as the clock drift may be nonlinear over the drilling run. Accordingly, it is desirable to provide an alternative system and method for correcting downhole measurements due to clock drifts.

SUMMARY OF THE DISCLOSURE

One embodiment of the present disclosure is a method for accounting for or correcting for a drift in a downhole clock during a wellbore operation. In one aspect, the method may include: taking a plurality of measurements during drilling of the wellbore; transmitting a plurality of signals over a time period that are generated at a first location during drilling of the wellbore; recording time corresponding to the plurality of signals using a first clock associated with the first location; receiving at a second location the plurality of signals generated at the first location and recording the time for the received signals in the plurality of signals using a second clock that is associated with the second location; and correcting the downhole measurements using the time recorded using the first clock and the second clock. In one aspect, the first clock is located downhole and the second clock is located at the surface or vice versa. The downhole clock may be located in a bottomhole assembly that includes a tool or sensor that takes the measurements. The tool may contain its own clock. In one aspect, the method provides for computing a difference between each of the times recorded using the first clock and a corresponding time recorded using the second clock and using the computed differences in time to correct the downhole measurements. In the method, correcting the downhole measurements may be done by aligning the downhole measurements with respect to time using the time differences. The downhole measurements may be corrected with respect to depth of the wellbore. The method also provides for synchronizing the first clock and the second clock before drilling of the wellbore. To determine the time difference, an estimated time of travel of a particular signal between the first location and the second location is subtracted from the total time of travel of that signal. A curve may be fitted between the times recorded by using each of the clocks to determine the time drift relation between the two clocks over the time period. Alternatively, a table may be computed showing the time differences. The method further provides for aligning the downhole measurements with respect to the wellbore depth by utilizing a predetermined time-depth relationship for the wellbore profile and the time differences between the two clocks over the drilling time period. The signals may be transmitted using a: (i) mud pulse telemetry; (ii) acoustic telemetry; (iii) electromagnetic telemetry; (iv) wired pipe telemetry; or (v) another suitable telemetry system. The signals may be of any suitable kind, including any one of: (i) a signal that includes a clock synchronization feature; (ii) a weight-on-bit; (iii) a rotational speed of the drill bit or the drill string, (iv) a telemetry signal generator that generates pressure pulses; (v) a signal generated by a mud pump; or (vi) a signal generated by a bypassing drilling fluid.

In another aspect, the disclosure is a system for making downhole measurements during drilling of a wellbore that includes a tool that takes the measurements for a parameter of interest and a downhole clock that is used to record the time of the measurements. A signal generator associated with the system transmits synchronization signals between a downhole location and a surface location. A downhole controller, which may include a processor, records a time associated with the synchronization pulse using a clock downhole and a surface controller records time of each such pulse associated with the surface location using a surface clock.

A processor, which may be located anywhere, uses the time recorded by using the surface and downhole clocks to correct or align the downhole measured data with respect to the depth of the wellbore. Each signal includes a feature that identifies that such a signal is a synchronization signal that needs to be time stamped and stored. A processor computes a difference between each time recorded using the first clock and a corresponding time recorded using the second clock. The processor uses the computed differences in time to correct the downhole measurements. In one aspect, the processor aligns the downhole measurements with respect to time using the time differences. The downhole measurements are also corrected or aligned with respect to depth of the wellbore. The surface and the downhole clocks are synchronized before drilling of the wellbore section for which measurements are taken. To determine the time difference for any particular signal, an estimated time of travel of the particular signal between the first location and the second location is subtracted from the total time of travel of that signal between the two locations. A curve fitting technique may be used on the recorded times to determine the time drift relation between the two clocks over the time period. A predetermined time-depth-profile of the wellbore may be used for aligning the downhole measurements.

The system further includes a telemetry system for generating and receiving signals between a downhole location and a surface location, which may any suitable telemetry system or technique, including: (i) a mud pulse telemetry system; (ii) an acoustic telemetry system; (iii) an electromagnetic telemetry system; or (iv) another suitable telemetry system. The signals may be of any suitable kind, including any one of: (i) a signal that includes a clock synchronization feature; (ii) a weight-on-bit; (iii) a rotational speed of the drill bit or the drill string (iv) a signal generated by a pulser that generates pressure pulses; (v) a signal generated by a mud pump; or (vi) a signal generated by a bypassing drilling fluid. The recorded times and any other data may be stored in a suitable medium, such a memory device, disk, etc.

Another embodiment of the disclosure is a computer-readable-medium for use with a measurement while drilling (MWD) system. The MWD system includes a first clock at a surface location and a second clock carried by a bottomhole assembly (BHA). The computer-readable medium includes one or more computer programs that include instructions that are executed by a computer or processor to implement the methods of this disclosure and to carry out certain operations of the system of the disclosure.

BRIEF DESCRIPTION OF THE DRAWINGS

The present disclosure is best understood with reference to the accompanying figures in which like numerals refer to like elements and in which.

DETAILED DESCRIPTION OF THE DISCLOSURE

Figure 1:
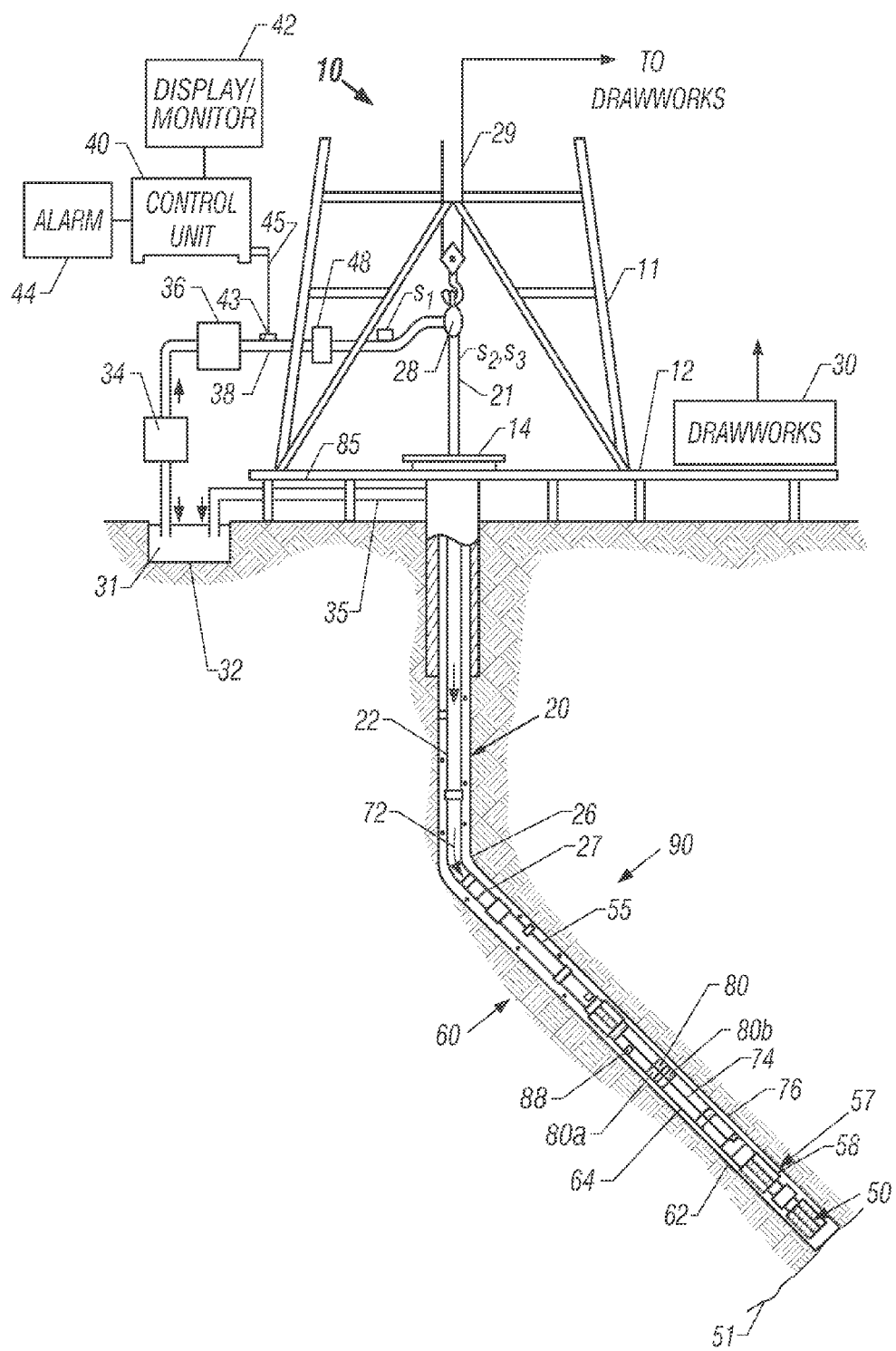
FIG. 1 shows a schematic diagram of a drilling system that includes a bottomhole assembly having downhole tools and sensors offset from the drill bit and a surface clock and one or more downhole clocks according to one embodiment of the disclosure.

FIG. 1 shows a schematic diagram of a drilling system 10 according to one embodiment of the disclosure that includes a drillstring 20 having a drilling assembly 90, also referred to as a bottomhole assembly (BHA), conveyed in a borehole 26 for drilling a wellbore 26 in an earth formation. The drilling system 10 includes a conventional derrick 11 erected on a floor 12 that supports a rotary table 14 that is rotated by a prime mover, such as an electric motor (not shown), at a desired rotational speed. The drillstring 20 may include drilling tubulars 22 (such as a drill pipe) sections. A drill bit 50, attached to the end of the BHA 90, disintegrates the geological formations 60 when it is rotated to drill the borehole 26. The drillstring 20 is coupled to a drawworks 30 via a kelly joint 21, swivel 28 and line 29 through a pulley. During the drilling operations, the drawworks 30 is operated to control the weight on bit (WOB), which affects the rate of penetration (ROP). The operation of the drawworks 30 is well known in the art and is thus not described in detail herein.

During drilling operations a suitable drilling fluid 31 (also referred to as the "mud") from a source or mud pit 32 is circulated under pressure through the drillstring 20 by a mud pump 34. The drilling fluid 31 passes from the mud pump 34 into the drillstring 20 via a desurger 36, fluid line 38 and the Kelly joint 21. The drilling fluid 31 is discharged at the borehole bottom 51 through an opening in the drill bit 50. The drilling fluid 31 circulates uphole through the annular space 27 (annulus) between the drillstring 20 and the borehole 26 and returns to the mud pit 32 via a return line 35. A sensor S1 in the line 38 provides information about the fluid flow rate. A surface torque sensor S2 and a sensor S3 associated with the drillstring 20 respectively provide information about the torque and the rotational speed of the drillstring. Additionally, one or more sensors (not shown) associated with line 29 are used to provide the hook load of the drillstring 20 and information about other desired parameters relating to the drilling of the wellbore 26.

In some applications, the drill bit 50 is rotated by only rotating the drill pipe 22. In other applications, a downhole motor 55 (mud motor) disposed in the drilling assembly 90 is used to rotate the drill bit 50 and/or to superimpose or supplement the rotational power of the surface motor. In either case, the rate of penetration of the drill bit 50 into the borehole 26 for a given formation and a drilling assembly largely depends upon the weight on bit, drill bit rotational speed and the type of the formation.

In one aspect of the embodiment of FIG. 1, the mud motor 55 is coupled to the drill bit 50 via a drive shaft (not shown) disposed in a bearing assembly 57. The mud motor 55 rotates the drill bit 50 when the drilling fluid 31 passes through the mud motor 55 under pressure. The bearing assembly 57 supports the radial and axial forces of the drill bit 50, the downthrust of the mud motor, and the reactive upward loading from the applied weight on bit. A stabilizer 58 coupled to the bearing assembly 57 acts as a centralizer for the lowermost portion of the mud motor assembly.

A surface control unit 40 (surface controller) receives signals from the downhole sensors and devices via a sensor 43 placed in the fluid line 38 and signals from sensors S1, S2, S3, hook load sensor and any other sensors used in the system and processes such signals according to programmed instructions provided to the surface control unit 40. The surface control unit 40 displays desired drilling parameters and other information on a display/monitor 42 that is utilized by an operator to control the drilling operations. The surface control unit 40 contains a computer or a processor, a data storage medium, such as a solid state memory for storing data, recorder for recording data and other peripherals. The surface control unit 40 also includes a simulation model and processes data according to programmed instructions and responds to user commands entered through a suitable device, such as a keyboard. The surface control unit 40 is adapted to activate alarms 44 when certain unsafe or undesirable operating conditions occur. The surface controller 40 also includes a clock referred to herein as the "surface clock" for time stamping measurements received from downhole tools and sensors via the telemetry system 72 and for time stamping surface generated data, such as pulses or signals sent downhole. The surface computer also stores in the memory the time-stamped data as explained in more detail in reference to FIGS. 4-5.

Referring back to FIG. 1, BHA 90 also contains other sensors and devices or tools for providing a variety of measurements relating to the formation surrounding the borehole and for drilling the wellbore 26 along a desired path. Such devices include a gamma ray device for measuring the formation gamma ray intensity and devices for determining the inclination and azimuth of the drillstring. The formation resistivity tool 64 may be coupled above the lower kick-off subassembly 62 that provides signals from which resistivity of the formation near or in front of the drill bit 50 can be determined. Inclinometer 74 and gamma ray device 76 are suitably placed along the resistivity measuring device 64 for respectively determining the inclination of the BHA and the formation gamma ray intensity. Any suitable inclinometer and gamma ray device may be utilized. In addition, an azimuth device (not shown), such as a magnetometer or a gyroscopic device, may be utilized to determine the drillstring azimuth. Such devices are known in the art and therefore are not described in detail herein.

Still referring to FIG. 1, other measurement-while-drilling (MWD) or logging-while-drilling (LWD) devices such as devices for measuring formation porosity, permeability and density, also are often placed above the mud motor 55 for providing information useful for evaluating the subsurface formations along borehole 26. Each tool and sensor in the BHA is longitudinally offset from the drill bit 55. For example, a gamma ray tool may have an offset from the drill bit of 10 ft., a resistivity tool with an offset of 25 ft., while an acoustic tool may have an offset of 100 ft.

The above-noted tools transmit data to the downhole telemetry system 72, which in turn transmits the received data uphole to the surface control unit 40. The downhole telemetry system 72 also receives signals and data from the uphole control unit 40 and transmits such received signals and data to the appropriate downhole tools. In one aspect, a mud pulse telemetry system may be used to communicate data between the downhole sensors and devices and the surface equipment during drilling operations. Transducer 43 placed in the mud supply line 38 detects the mud pulses responsive to the data transmitted by the downhole telemetry 72. Transducer 43 generates electrical signals in response to the mud pressure variations and transmits such signals via a conductor 45 to the surface control unit 40. Mud pulses at the surface may be generated by the mud pump 34 or a pulser or a bypass valve (generally denoted by numeral 48). In other aspects, electromagnetic telemetry, acoustic telemetry or another suitable telemetry technique may be utilized.

The drilling system described thus far relates to those drilling systems that utilize a drill pipe to convey the drilling assembly 90 into the borehole 26, wherein the weight on bit is controlled from the surface, typically by controlling the operation of the drawworks. However, a large number of the current drilling systems, especially for drilling highly deviated and horizontal wellbores, utilize coiled-tubing for conveying the drilling assembly downhole. In such application a thruster is sometimes deployed in the drillstring to provide the desired force on the drill bit. Also, when coiled-tubing is utilized, the tubing is not rotated by a rotary table but instead it is injected into the wellbore by a suitable injector while the downhole motor, such as mud motor 55, rotates the drill bit 50. For offshore drilling, an offshore rig or a vessel is used to support the drilling equipment, including the drillstring. In wireline applications a series of formation evaluation tools, including a resistivity tool, are lowered into a wellbore and measurements from all such tools are logged and processed.

Still referring to FIG. 1, the BHA includes at least one clock 80 for time stamping downhole measurements. Alternatively, different tools may include separate downhole clocks, such as clock 80a and 80b. Typically, each downhole tool also includes a downhole controller, which may include a microprocessor, a data storage medium, such as a solid state memory, and associated electronic circuitry for processing the measurements taken by the tool. Each such downhole controller is designated here for convenience with numeral 88. The downhole controller also time-stamps these measurements utilizing the time from an associated downhole clock during the drilling of the wellbore. The downhole controller 88 also stores and records the time-stamped measurements or data in the downhole data storage medium, which data storage may be continuous during the time the tool is taking the measurements. The downhole controller 88 also receives signals from the surface, including synchronization signals that may be periodically sent downhole. In one aspect, the downhole controller time stamps the received synchronization signals using a downhole clock and stores such data in a data storage medium. The synchronized signals and other signals also may be sent from a downhole location to a surface location.

Figure 2:
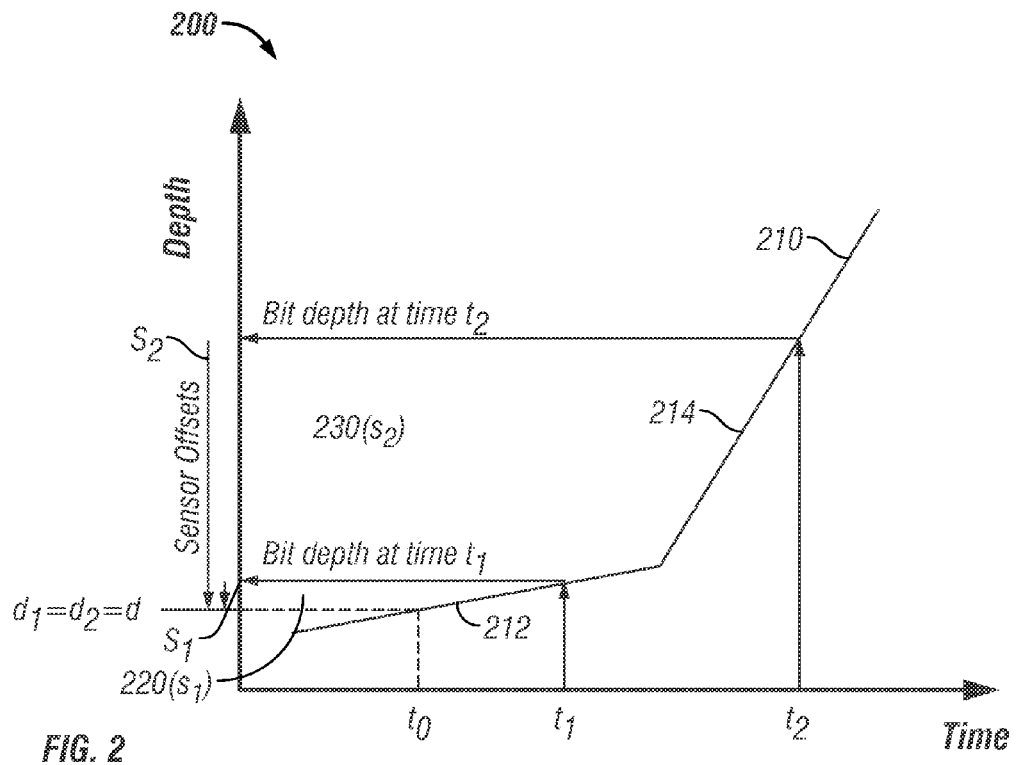
FIG. 2 shows a plot of an example of time and depth relationship of measurements made by two downhole sensors having different offsets when there is no drift in the downhole clock.
Figure 3:
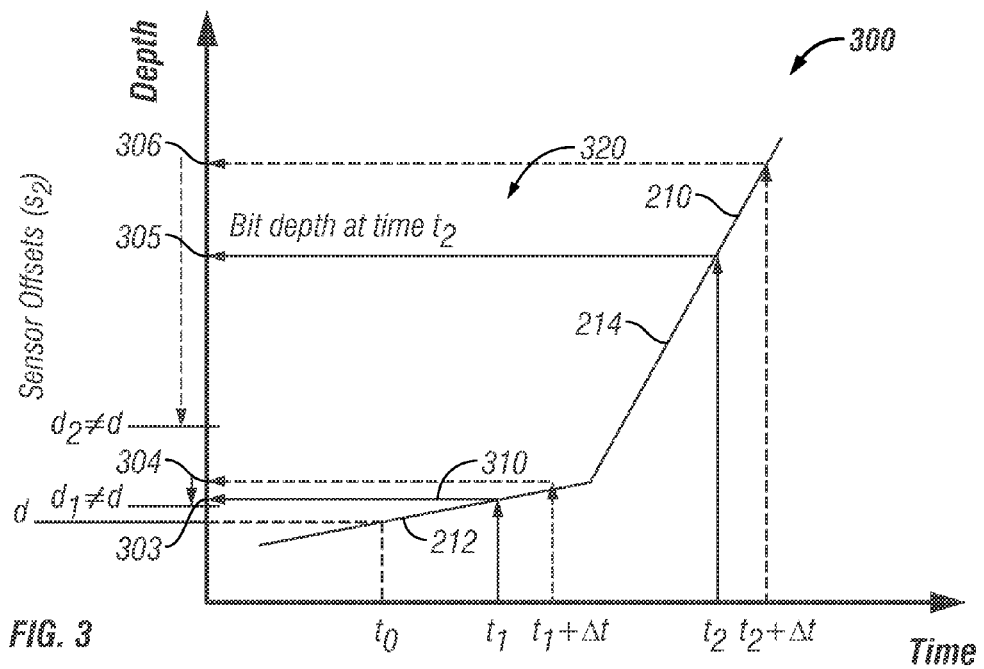
FIG. 3 shows a plot similar to the plot of FIG. 2 when there is a constant drift of the downhole clock.

For ease of understanding the concepts and details relating to the disclosure, it is considered helpful to describe certain effects of downhole clock drifts, which effects are described herein in reference to FIGS. 2 and 3. FIG. 2 shows a plot 200 of an example of time and depth relationship of measurements made by two downhole sensors that are offset from the drill bit when there is no drift in the downhole clock. The example of FIG. 2 relates to two sensors measuring a same property downhole (for example a gamma ray measurement) wherein the sensors $S_1$ and $S_2$ are located at different places in the BHA. This example assumes that the first sensor is at an offset $s_1$ 220 and the second sensor is at offset $s_2$ 230, wherein $s_2>s_1$ (i.e. the second sensor is located farther from the bit). In this scenario, the sensors $S_1$ and $S_2$ will be at or go through the same formation horizon or feature (located at depth "d") at different times. For example, the drill bit will go through the feature at depth d at time $t_0$, while sensor $S_1$ will go through the same depth at time $t_1$, and the sensor $S_2$ will go through at time $t_2$. To estimate or determine the depth of a particular sensor measurement, one can determine the bit depth for time when the measurement was made (using a known time-depth profile for the bit) and subtract the sensor offset, such as $s_1$ and $s_2$. The plot 200 assumes a correct time-depth profile 210, wherein the ROP for the first section 212 is substantially less than the ROP for the second section 214, and that the surface and downhole clocks are perfectly synchronized. In this case, the depth for the entire horizon is the same for measurements by both sensors $S_1$ and $S_2$. As shown in FIG. 2, where the time-depth is correct and there is no downhole clock drift, the times $t_1$ and $t_2$ will correspond to the correct depths i.e. $d=d_1=d_2$.

FIG. 3 shows a plot 300 that is similar to the plot 200 of FIG. 2 for a condition when the downhole clock drift is constant ($\Delta t$) but the time-depth relationship is correct. In this case, the formation horizon is seen at different depths for the sensors $S_1$ and $S_2$ and therefore the estimated depths will be different from the actual depths. As shown in FIG. 3, the sensor $S_1$ will be at depth 304 (corresponding to downhole clock time of $t_1+\Delta_t$) instead of at 303, the depth computed using the surface clock. Similarly, sensor $S_2$ will be at depth 306 (corresponding to time $t_2+\Delta_t$) instead of at depth 305. In the example shown, the depth error for the $S_1$ sensor measurements will be equal to gap 310 and the depth error for $S_2$ sensor measurements will be equal to the gap 320.

To solve the above-noted discrepancy, the downhole clock is synchronized with the surface clock during the tool's programming. As noted earlier, due to various reasons (temperature, vibration, etc.) the downhole clocks can drift over time during the drilling of the wellbore. The clock drift can be accounted for when the drift can be approximated by a linear function with sufficient accuracy. In this case, the downhole clock is synchronized at the start of the run, at which time the drift or mismatch is zero (i.e. $\Delta t_s=o$) and the drift is determined at the end of the run, the end of the run being $\Delta t_e$. The corrected time (downhole) can then be computed from:

$$t_{corrected} = T_{downhole} + \Delta t_e [(t_{downhole} - t_{run\text{-}start})/(t_{run\text{-}end} - t_{run\text{-}start} - \Delta t_e)]$$

where $t_{corrected}$ is the corrected downhole time, $t_{run\text{-}start}$ is the surface clock run start time, $t_{downhole}$ is the downhole time at a particular point in time that is to be corrected, and $t_{run\text{-}end}$ is the time of the end of the run provided by the surface clock.

Figure 4:
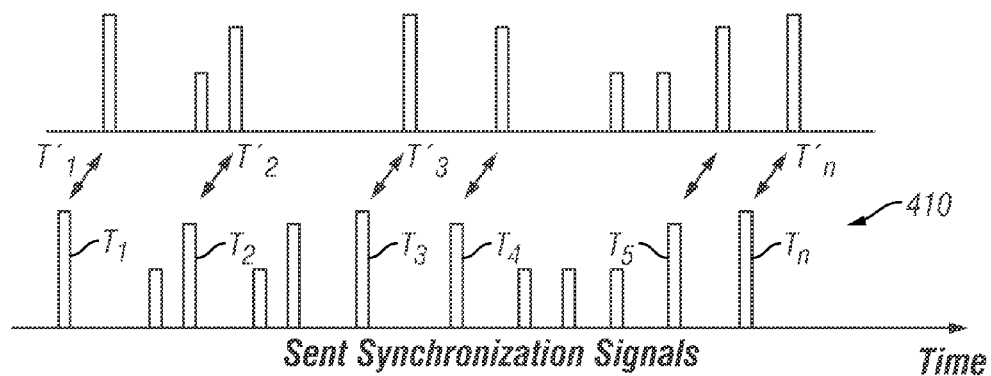
FIG. 4 shows a series of synchronization pulses that are time-stamped using a downhole clock and a surface clock during drilling of a wellbore according to one embodiment of the disclosure.

In another aspect, the present invention provides a method and system for correcting downhole clock drift when the drift is non-linear over time. FIG. 4 shows an example of a synchronization signal scheme that may be used to correct for such time drifts. During drilling of the wellbore, synchronization signals are periodically transmitted between a downhole location and a surface location. The transmitted signals may be generated at the downhole location and received at the surface location or vice versa. An example of the periodically generated synchronization signals is shown by time spaced signals 410. In the particular example of FIG. 4, signals $T_1$ through $T_n$ are generated at a first location (for example downhole) and transmitted to a second location (for example the surface). It takes time for a signal to propagate between a downhole location and a surface location. For mud pulse telemetry, this delay depends on the distance between the transmitter/pulser and the receiver and the properties of the mud. The delay is estimated from the time-depth profile utilizing the time information when the signal was received. Preset values for the speed of sound in the mud may be used, which values may be adjusted using information collected during downlinking. Each synchronization pulse generated is time-stamped and stored in a memory. For example, when the synchronization signals are generated downhole, a downhole clock is used to time-stamp each such signal. If the signals are generated at the surface, the surface clock is used to time-stamp each such signal. As shown, the signal $T_1$ is received time shifted at $T'_1$ (after accounting for the transmission time through the mud) by a certain amount due to the drift in the downhole clock. Similarly, synchronization signals $T_2$-$T_n$ also are received time shifted, wherein the time shift for different synchronization signals may vary. The downhole time-stamped synchronization signals are stored in a tool data storage device and surface time-stamped synchronization signals are stored in a surface data storage device. At the end of the run i.e. after tripping the BHA from the wellbore, the downhole stored time-stamped data is retrieved. The surface time-stamped and the downhole time-stamped synchronization signals are then utilized to correct for the clock drift of the entire measurement log of a downhole tool. This method allows for correcting clock drift for the entire run corresponding to each synchronization signal time.

Figure 5:
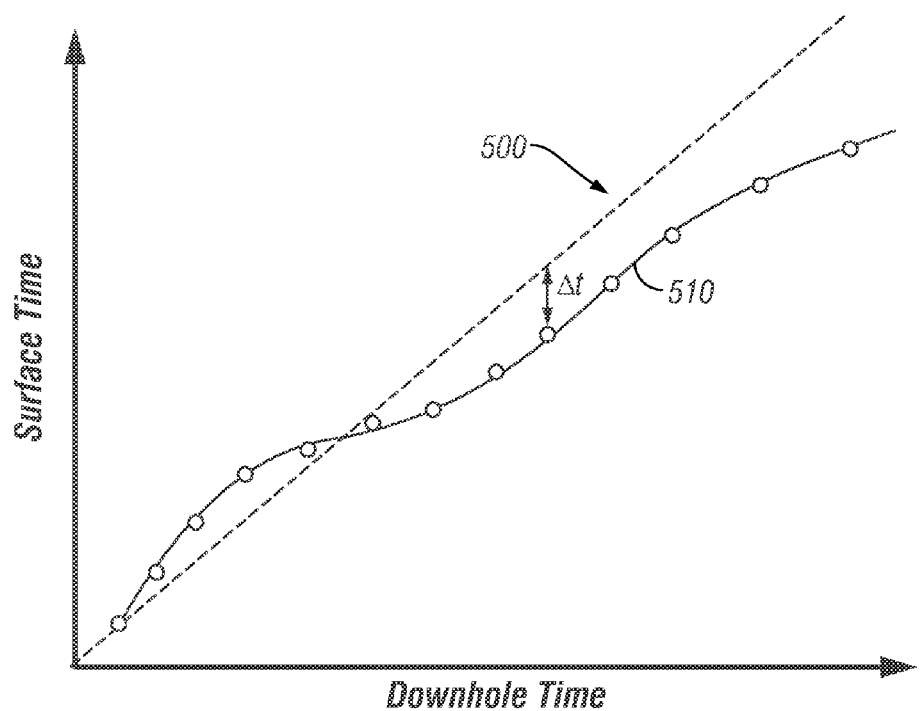
FIG. 5 shows a time correction profile of a surface clock and a downhole clock corresponding to a synchronization pulse scheme similar to the pulse scheme shown in FIG. 4.

From the time-stamped data and the travel time of the signals between the downhole and surface locations, a time correction profile for the tool may be created. FIG. 5 shows a graph 500 of the relationship between the downhole clock time and the surface clock time for a particular run. The curve 510 provides a relationship between the surface clock time and the downhole clock time at each of the various synchronization pulse times. The dashed line is at a 45 degree angle to the time axes and corresponds to the relationship between two synchronized clocks. The difference $\Delta t$ at any particular time is attributed to the downhole clock drift. Therefore, by time shifting the depth measurements according to the curve 510, the clock drift correction may be made for the entire run. Any suitable curve fitting technique may be used to generate the curve 510. Alternatively, a table may be provided for drifts at selected points and used to correct the logs at such points.

As noted earlier, different tools in the BHA may include separate clocks, each of which may drift differently. In the case where more than one clock is used, the clock drift time correction method described above may be utilized for each such clock prior to correlating the various logs. For multiple clocks, in one aspect, a master clock downhole may periodically query each of the remaining clocks (nodes or slaves) and store the master time and each node time in a master memory. Alternatively, the master downhole clock may broadcast its time and each node may store such time together with the corresponding node time in a node memory. The stored time data is then used to make a correction map for each node. This table may also be utilized to restore time in case the master or a node clock resets. Also, the slaves may synchronize to the master clock.

One embodiment of the present disclosure is a method for accounting for or correcting for a drift in a downhole clock during a wellbore operation. In one aspect, the method may include: taking a plurality of measurements during drilling of a wellbore; transmitting a plurality of signals over a time period that are generated at a first location during drilling of the wellbore; recording time corresponding to the plurality of signals using a first clock associated with the first location; receiving at a second location the plurality of signals generated at the first location and recording the time for the received signals in the plurality of signals using a second clock that is associated with the second location; and correcting the downhole measurements using the time recorded using the first clock and the second clock. In one aspect, the first clock is located downhole and the second clock is located at the surface or vice versa. The downhole clock may be located in a bottomhole assembly that includes a tool or sensor that takes the measurements. The tool may contain its own clock.

Thus, in one aspect, the disclosure provides a method for computing a difference between each of the times recorded using the first clock and a corresponding time recorded using the second and using the computed differences in time to correct the downhole measurements. In another aspect, correcting the downhole measurements may be done by aligning the downhole measurements with respect to time using the time differences. In another aspect, the downhole measurements may be corrected with respect to depth of the wellbore. The method also provides for synchronizing the first clock and the second clock before drilling of the wellbore. To determine the time difference, an estimated time of travel of a particular signal between the first location and the second location may be subtracted from the total time of travel of that signal. A curve may be fitted between the times recorded by using each of the clocks to determine the time drift relation between the two clocks over the time period. Alternatively, a table may be computed showing the time differences. The method further may provide for aligning the downhole measurements with respect to the wellbore depth by utilizing a predetermined time-depth relationship for the wellbore profile and the time differences between the two clocks over the drilling time period. The signals may be transmitted using a: (i) mud pulse telemetry; (ii) acoustic telemetry; (iii) electromagnetic telemetry; (iv) wired pipe telemetry; or (v) another suitable telemetry system. The signals may be of any suitable kind, including any one of: (i) a signal that includes a clock synchronization feature; (ii) a weight-on-bit; (iii) a rotational speed of the drill bit or the drill string, (iv) a telemetry signal generator that generates pressure pulses; (v) a signal generated by a mud pump; or (vi) a signal generated by a bypassing drilling fluid.

In another aspect, the disclosure provides an apparatus for making downhole measurements during drilling of a wellbore that includes a tool that takes the measurements for a parameter of interest and a downhole clock that is used to record the time of the measurements. A signal generator associated with the system transmits synchronization signals between a downhole location and a surface location. A downhole controller, which may include a processor, records a time associated with the synchronization pulse using a clock downhole and a surface controller records time of each such pulse associated with the surface location using a surface clock.

A processor, which may be located anywhere, is configured to use the time recorded by using the surface and downhole clocks to correct or align the downhole measured data with respect to the depth of the wellbore. Each signal may include a feature that identifies that such a signal is a synchronization signal that needs to be time stamped and stored. The processor may be configured to compute a difference between each time recorded using the first clock and a corresponding time recorded using the second clock. The processor may use the computed differences in time to correct the downhole measurements. In one aspect, the processor may align the downhole measurements with respect to time using the time differences. The downhole measurements may also be corrected or aligned with respect to depth of the wellbore. The surface and the downhole clocks are synchronized before deploying the downhole clock into the wellbore. To determine the time difference for any particular signal, an estimated time of travel of the particular signal between the first location and the second location may be subtracted from the total time of travel of that signal between the two locations. A curve fitting technique may be used on the recorded times to determine the time drift relation between the two clocks over the time period. A predetermined time-depth-profile of the wellbore may be used for aligning the downhole measurements.

The apparatus may further include a telemetry system for generating and receiving signals between a downhole location and a surface location, which may any suitable telemetry system or technique, including: (i) a mud pulse telemetry system; (ii) an acoustic telemetry system; (iii) an electromagnetic telemetry system; or (iv) another suitable telemetry system. The signals may be of any suitable kind, including any one of: (i) a signal that includes a clock synchronization feature; (ii) a weight-on-bit; (iii) a rotational speed of the drill bit or the drill string (iv) a signal generated by a pulser that generates pressure pulses; (v) a signal generated by a mud pump; or (vi) a signal generated by a bypassing drilling fluid. The recorded times and any other data may be stored in a suitable medium, such as a memory device, disk, etc.

Another embodiment of the disclosure may provide a computer-readable-medium for use with a measurement while drilling (MWD) system. The MWD system includes a first clock at a surface location and a second clock carried by a bottomhole assembly (BHA). The computer-readable medium includes one or more computer programs that include instructions that are executed by a computer or processor to implement the methods of this disclosure and to carry out certain operations of the system of the disclosure.

The particular embodiments disclosed above are illustrative only, as the present subject matter may be modified and practiced in different but equivalent manners apparent to those skilled in the art having the benefit of the teachings herein. Furthermore, no limitations are intended to the details of construction or design herein shown, other than as described in the claims. It is therefore evident that the particular illustrative embodiments disclosed above may be altered or modified and all such variations are considered within the scope and spirit of the present claimed subject matter.

The invention claimed is:

1. A method for correcting downhole measurements; comprising:

taking a plurality of measurements over a time period during drilling of a wellbore using a sensor;

recording times of taking the plurality of measurements using a first clock at a first location in the wellbore;

transmitting a synchronization signals through a fluid in the wellbore by a transmitter generated at the first location during drilling of the wellbore;

recording a time of transmitting the synchronization signal using the first clock associated with the first location;

receiving the synchronization signals at a second location;

recording a time of receiving the synchronization signal using a second clock associated with the second location;

determining a time delay for the synchronization signal using a distance between the first location and the second location and a speed of sound in the fluid in the wellbore;

retrieving the measurements from the wellbore after the time period;

determining a time drift relation between the first clock and the second clock using the determined time delay; and using the determined time drift relation to correct the plurality of times at which the measurements are taken over the time period.

2. The method of claim 1, wherein the first location is one of a surface location and a downhole location and the second location is the other of the surface location and the downhole location.

3. The method of claim 1, wherein correcting the plurality of measurements comprises aligning the measurements with respect to time using the determined time drift relation.

4. The method of claim 3, wherein correcting the plurality of measurements comprises correcting the plurality of measurements as a function of depth.

5. The method of claim 1 further comprising synchronizing the first and the second clocks prior to taking the plurality of measurements.

6. The method of claim 1 further comprising fitting a curve between the times recorded by using the first clock and the second clock to determine the time drift relation between the first clock and the second clock for correcting the drift of one of the first clock and the second clock with respect to the other of the first clock and the second clock.

7. The method of claim 1 further comprising aligning the plurality of measurements with respect to a wellbore depth by utilizing a predetermined time-depth profile of the wellbore and the determined time drift relation between the first clock and the second clock over the selected time period for the drilling of the wellbore.

8. The method of claim 1, wherein the plurality of signals is transmitted from the first location to the second location by utilizing at least one of: (i) mud pulse telemetry; (ii) acoustic telemetry; (iii) electromagnetic telemetry; and (iv) wired-pipe telemetry.

9. The method of claim 1, wherein the plurality of signals include signals relating to one of: (i) a clock synchronization feature; (ii) a weight-on-bit; (iii) a rotational speed of the drill bit; (iv) a rotational speed of a drill string; (v) pressure pulses generated by a pulser in a fluid line supplying fluid to the wellbore; and (vi) pressure pulses generated in a fluid supplied to the wellbore by a mud pump.

10. The method of claim 1 wherein determining a time drift relation further comprises subtracting the determined time delay from a difference between the time for transmitting the synchronization signal recorded at the first clock and the time for receiving the synchronization signal recorded at the second clock.

11. An apparatus for use in drilling of a wellbore, comprising:
a first sensor configured to take measurements over a time period downhole relating to a parameter of interest;
a signal generator at a first location configured to transmit a synchronization signals through a fluid in the borehole over the time period;
a first clock at the first location;
a first controller configured to record from the first clock a time at which the synchronization signals is transmitted by the signal generator and the times at which the downhole measurements are taken;
a second clock at the second location;
a second controller configured to record from the second clock a time at which the transmitted synchronization signals is received at the second location; and
a processor configured to:
retrieve the measurements after the time period, determine a time delay for the synchronization signal using a distance between the first location and the second location and a speed of sound in the fluid in the borehole,
determine a time drift relation between the first clock and the second clock using the determined time delay, and
use the determined time drift relation to correct the times at which the measurements are taken over the time period.

12. The apparatus of claim 11, wherein the first location is a surface location and the first controller is a surface controller, and wherein the second location is a downhole location and the second controller is a downhole controller.

13. The apparatus of claim 11, wherein:
the signal generator is configured to generate a signal that includes a feature that identifies that the signal is a synchronization signal; and
the processor is configured to identify such a signal as a synchronization signal and to time stamp such synchronization signal using the second clock.

14. The apparatus of claim 11, wherein the processor is further configured to align the downhole measurements with respect to time using the determined time drift relation.

15. The apparatus of claim 11, wherein the processor is further configured to align the downhole measurements with respect to depth of the wellbore using the determined time drift relation.

16. The apparatus of claim 11, wherein the first clock and the second clock are synchronized before taking the downhole measurements.

17. The apparatus of claim 16, wherein the processor utilizes a time-depth-profile of the wellbore for aligning the times of the at which the downhole measurements are taken.

18. The apparatus of claim 11, wherein the processor is configured to utilize a curve fitting technique on the recorded times to determine the time drift relation between the first clock and the second clock.

19. The apparatus of claim 11, wherein the signal generator and a second sensor together comprise a telemetry system for generating and receiving signals between a downhole location and a surface location that is selected from a group consisting of: (i) a mud pulse telemetry system; (ii) an acoustic telemetry system; (iii) an electromagnetic telemetry system; and (iv) a wired-pipe telemetry system.

20. A computer-readable medium for use with a measurement while drilling (MWD) system, the computer-readable medium including a computer program accessible to a processor to operate one or more tools, the computer program including:
instructions to time stamp each synchronization signal in a plurality of synchronization signals transmitted through a fluid in a wellbore from a first location using a first time clock;
instructions to time stamp a plurality of downhole measurements taken by a sensor in a wellbore over a selected time period using the first time clock;
instructions to time stamp each transmitted synchronization signal received at a second location using a second time clock;
instructions to determine a time delay for each synchronization signal using a distance between the first location and the second location and a speed of sound in the fluid in the borehole;
instructions to determine a time drift relation between the first clock and the second clock using the determined time delay; and instructions to use the determined time drift relation to correct the times at which the downhole measurements are taken over the selected time period.

* * * * *